(12) United States Patent
Lam et al.

(10) Patent No.: US 6,239,883 B1
(45) Date of Patent: May 29, 2001

(54) HIGH RESOLUTION SCANNER

(75) Inventors: Kai Yiu Lam, Torrance; Loi Han, Alhambra, both of CA (US)

(73) Assignee: Microtek International Inc., Taiwan ( * ) Notice: Subject to any disclaimer, the term of this patent is extended or adjusted under 35 U.S.C. 154(b) by 0 days.

(21) Appl. No.: 09/136,985

(22) Filed: Aug. 20, 1998

(51) Int. Cl.[7] ....................................................... H04N 1/40
(52) U.S. Cl. ............................................. 358/475; 358/474
(58) Field of Search .................................... 358/474, 475, 358/486, 487, 497; 382/312, 315

(56) References Cited

U.S. PATENT DOCUMENTS

| | | | | |
|---|---|---|---|---|
| 4,982,236 | * | 1/1991 | Bock | 355/235 |
| 5,574,274 | * | 11/1996 | Rubley | 250/208.1 |
| 5,724,159 | * | 3/1998 | Nakagawa | 358/474 |
| 6,009,292 | * | 12/1999 | Jinbo | 399/208 |
| 6,101,003 | * | 8/2000 | Wu | 358/474 |
| 6,111,666 | * | 8/2000 | Yoshinaga | 358/474 |
| 6,144,465 | * | 11/2000 | Hayashi | 358/474 |
| 6,147,777 | * | 11/2000 | Jung | 358/474 |

* cited by examiner

Primary Examiner—Jerome Grant II
(74) Attorney, Agent, or Firm—Small Larkin, LLP

(57) ABSTRACT

An improved high resolution scanner for use in a conventional scanner housing. A light receiving guide transversely moves a conventional lens and CCD for scanning portions of an object to be scanned. The resulting scanned portions, when combined, produce a high resolution image of the scanned image.

1 Claim, 7 Drawing Sheets

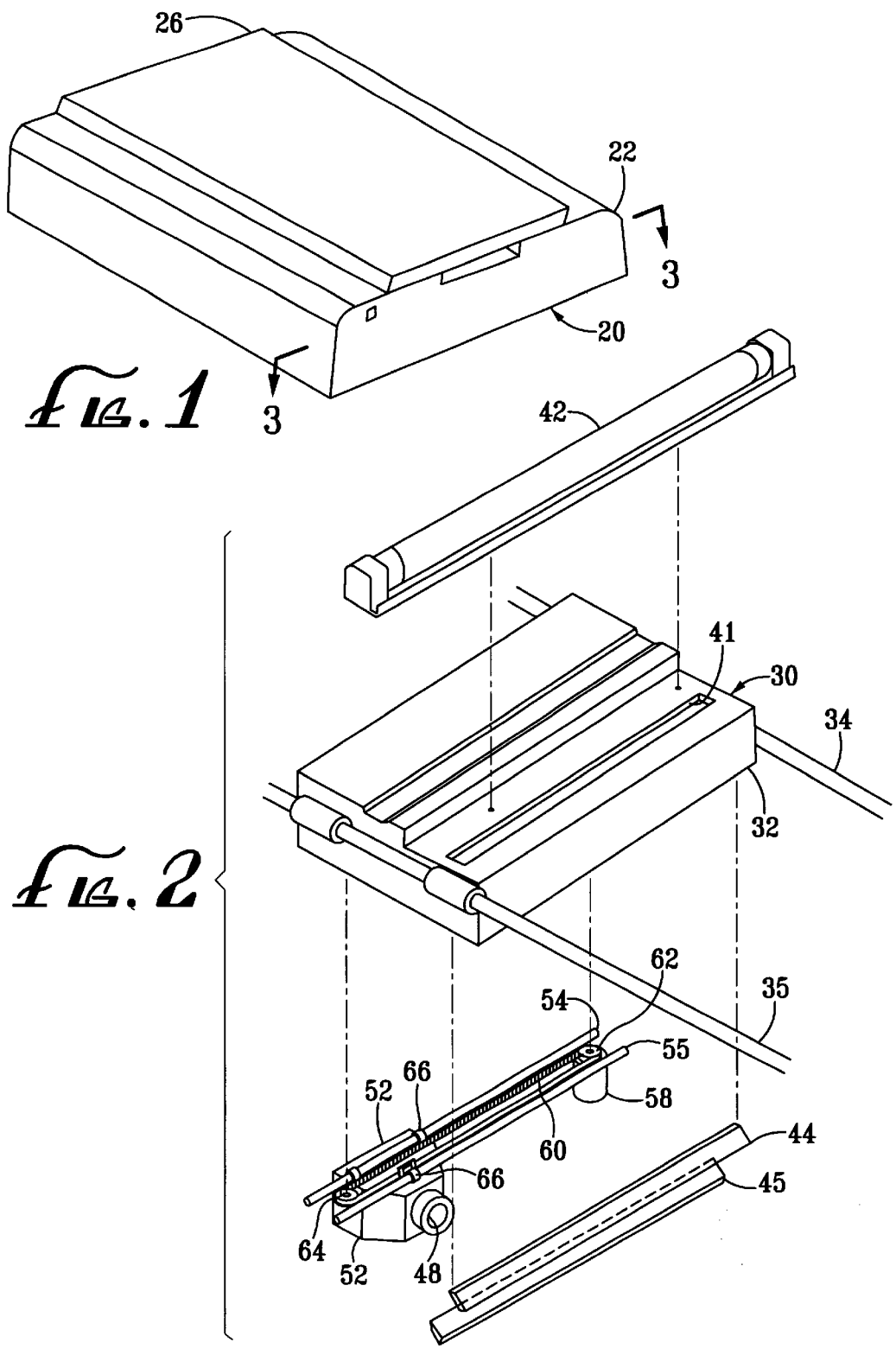

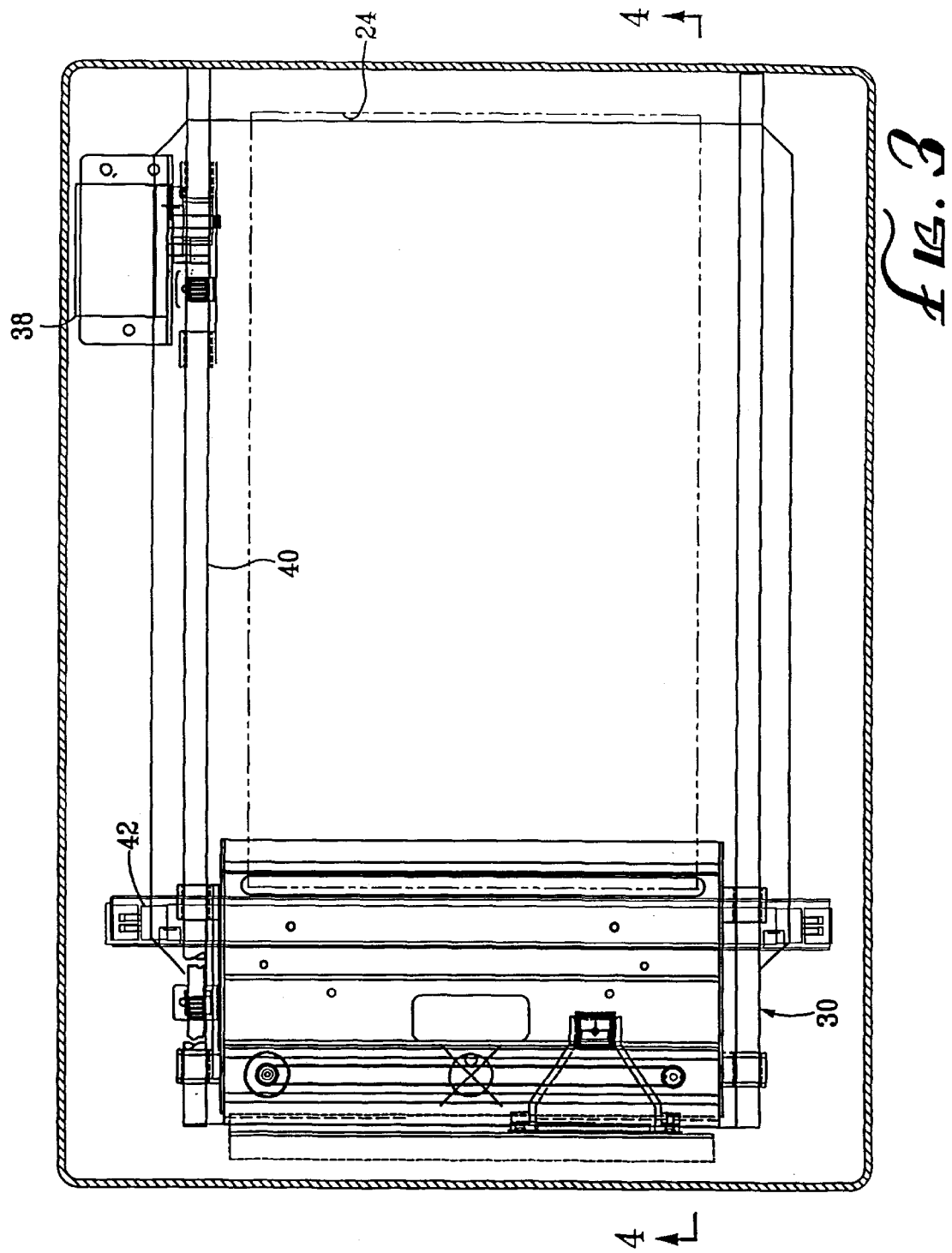

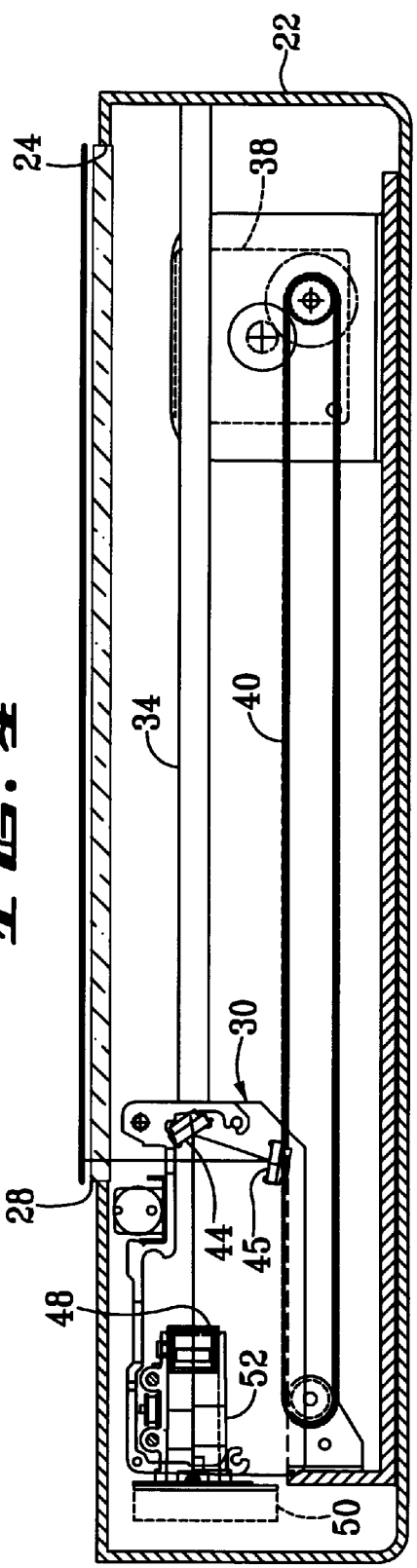

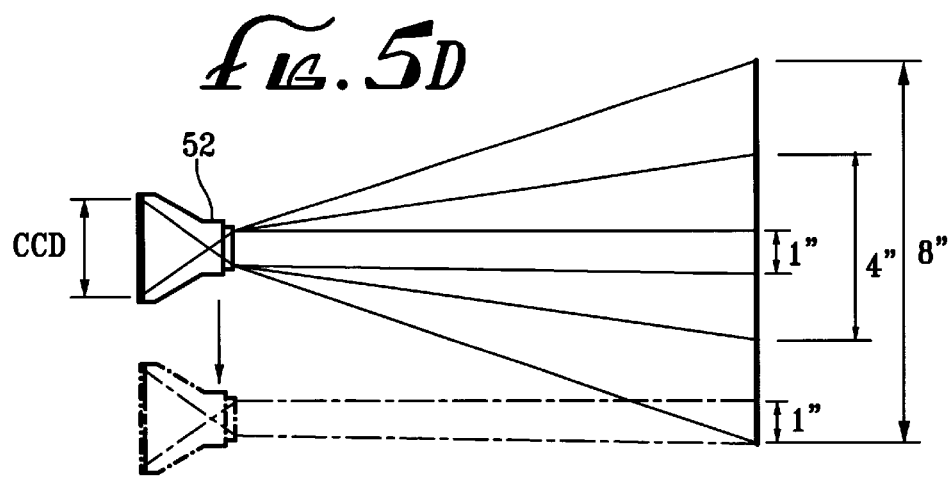
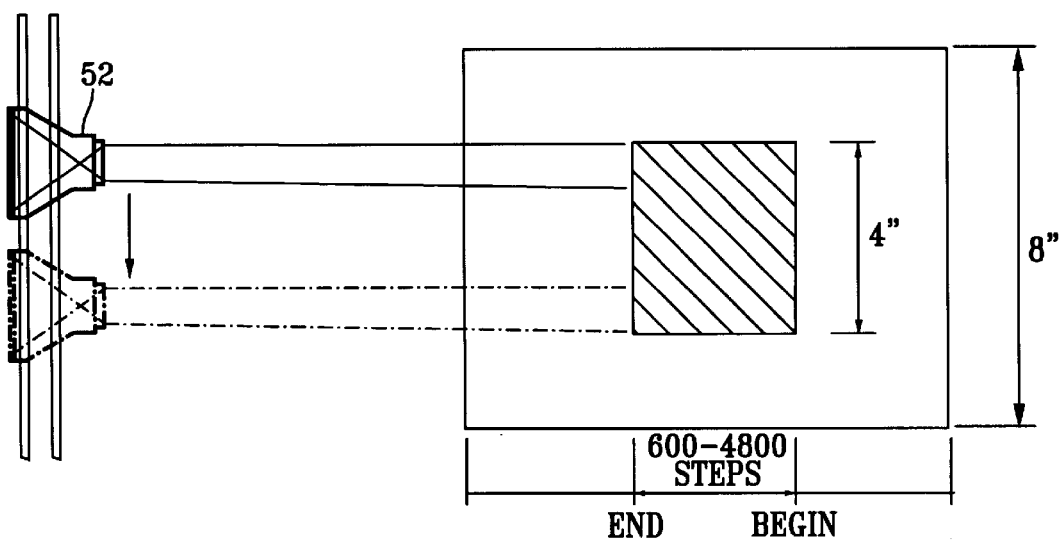

HIGH RESOLUTION SCANNER

BACKGROUND OF THE INVENTION

1. Field of the Invention

The present invention relates to high resolution optical scanners and, more particularly, to a high resolution scanning mechanism for use in a conventional optical scanner.

2. Description of the Related Art

Optical scanners are typically used to electronically reproduce visually perceptible images on materials, such as documents, photographs and transparencies, in a digital format for use by a computer. Once images have been stored on a computer, they may be altered and reproduced for any purpose, including the reproduction of high definition imaging for use in multimedia-type applications.

Optical scanners are available in a variety of configurations, tailored to the needs of the user. For example, low resolution, high speed scanners are used by many businesses for the electronic transfer of documents over local area networks and telephone lines using facsimile machines. A conventional scanner includes a light-receiving device mounted in a light-receiving seat. The seat is coupled to a pair of rails and is movably adjusted along the rails for scanning line-by-line documents, photographs, transparencies, etc. The light-receiving device includes mirrors and a lens for focusing the image upon a charge coupled device (CCD) which then converts the light images into electrical signals. These signals are then digitized for use by a computer for reproduction and manipulation of the digitized image by commercially available software. In conventional scanners, the CCD is centrally mounted within the light-receiving device. The device may also include the use of a focusing mechanism for adjusting the distance between the lens and the CCD. While these devices are suitable for low resolution document reproduction, they are unable to provide the necessary resolution required for use with multimedia and digital photographic processing applications.

High resolution optical scanners have been proposed which are generally of a high cost due to the electro-optic transducers known as CCDs, required for high resolution. CCD resolution is determined by the number optical sensors 5 or pixels located linearly across the viewing area. These CCDs can be manufactured to obtain the desired high resolution by increasing the number of pixels per inch. However, high resolution CCDs are not readily available due to the high costs associated with these types of devices. Thus, it would be desirable to provide a high resolution scanner at a low production cost for use by a variety of users.

OBJECT OF THE INVENTION

The primary object of the present invention is to provide a high resolution scanning mechanism for use with a conventional CCD to increase the resolution of the CCD when scanning documents, transparencies and photographs.

Another object of the present invention is to provide an adaptor that can be coupled to a motorized, light receiving device for adapting the device to scan images at high resolutions.

Yet another object of the present invention is to provide a control program for use in a scanner central processing unit to control a motorized high resolution scanning mechanism to scan documents at high resolutions within a conventional scanner.

SUMMARY OF THE INVENTION

The present invention is a mechanism and method high resolution scanning within a conventional scanner, using a conventional CCD-type image processing device. The mechanism, when incorporated with a conventional light receiving device, provides high resolution images achieved at less cost in relation to other high resolution CCD scanner-type elements. The present device includes a telescoping mechanism within the light receiving seat for adjusting the distance between the lens and the CCD. The lens and CCD are located movably on a light-receiving guide. The light-receiving guide is mounted on a pair of rails within the light-receiving device, which run perpendicular to the rails connected to the light-receiving seat. The light-receiving guide is connected by a drive belt to a motor that can shift the light-receiving guide along the rails from a central position to either end. When the light-receiving device is moved to an off-center position, the light-receiving device lens may be telescopically advanced to zoom in on a smaller area to be scanned. Thus, the light-receiving device may be employed to scan columns comprising a smaller width of the object to be scanned. Software provided with the scanning device stores each column from the object to be scanned within memory. After the scanner scans in a first column of data, the light-receiving device then returns. The light receiving guide moves along the rails within the light-receiving device advancing to a second column position. When the object has been completely scanned, software within the scanner provides the necessary means for combining the columns of data into one image. With each column scanned at the conventional resolution, the combined image from the columns is at a higher resolution. The resolution achieved from two columns is greater than in normal scanning methods using the same CCD. Thus, a low cost, high resolution scanner is achieved using a conventional CCD. In addition, the mechanism provides a way for upgrading existing scanners to include a high resolution capability by exchanging the existing light receiving seat and software with the present invention.

BRIEF DESCRIPTION OF THE DRAWING(S)

The objects and advantages of the present invention will become more readily apparent to those of ordinary skilled in the art after reviewing the following detailed description and accompanying documents wherein:

FIG. 1 is a perspective view of a housing of the preferred embodiment;

FIG. 2 is an exploded view of the scanning mechanism of the preferred invention;

FIG. 3 is a cut-away top view of the document feeder of FIG. 1 taken along line 3—3;

FIG. 4 is a cut-away side view of the scanning mechanism of the present invention of FIG. 3 taken along line 4—4;

FIGS. 5D and 5E are diagrammatic views of an alternate embodiment of the present invention adapted for scanning a plurality of columns.

DESCRIPTION OF THE PREFERRED EMBODIMENT(S)

Figure 5A:
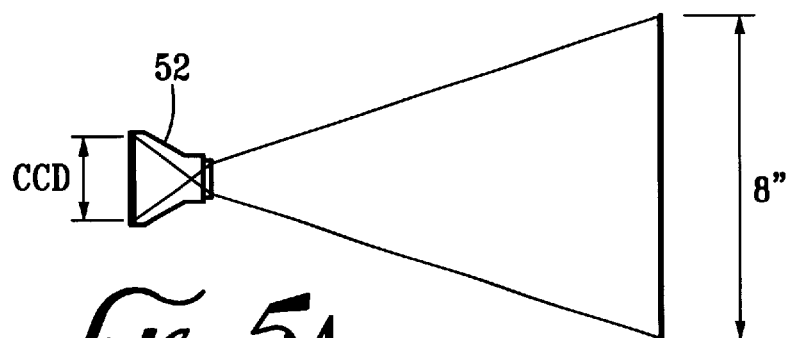
FIG. 5A is a diagrammatic view of a light-receiving guide adjusted for focusing on a full view of an image to be scanned.

Referring to the drawings more particularly by reference numbers, a conventional scanning device 20, FIGS. 1–4, includes a housing 22 having an object-receiving window 24, a glass platen 28 located in the window and an overlying lid 26 hinged at one end. While this scanner type is for scanning documents, the housing may have a conventional mount (not shown) for positioning slides or transparencies thereon. These types of mountings are well known in the art.

With reference to FIGS. 2–4 and 6, the scanner generally includes a light-receiving device 30. The light-receiving device 30 includes generally a light-receiving seat 32 that is conventionally mounted on a pair of rails 34 and 35. The seat is driven by a stepper motor 38 that drives a belt 40 connected to the light-receiving seat. The motor is generally of a conventional stepper motor type and the motor and drive belt combination is well known in the art.

The light-receiving seat includes an aperture that provides an opening between a lower optical receiving section and a light-producing upper section. Light illuminating from the object is projected through the aperture into the lower optical region. The lower optical region reflects the light off the mirrors through the lens and onto the CCD located in the light-receiving guide. The light-receiving seat 32 may also include a conventional light source 42, such as a fluorescent tube. For reflective scanners, the light source 42 is connected to the uppermost section of the seat 32 for reflecting light off the object to be scanned and back into the light-receiving device. For conventional transmissive scanners, the light source is mounted in an upper portion (not shown) of the scanner housing for transmitting light through the object to be scanned and into the light-receiving device. The connection of this light is well known in the art.

Included within the light-receiving seat 32 is a set of mirrors 44–45 and a lens 48 for focusing the received light from the image to be scanned upon a CCD 50. The mirrors are mounted in a conventional manner. The lens 48 and CCD 50 are included in a light-receiving guide 52. The guide 52 is movably connected to a pair of rails 54 and 55 mounted within the light-receiving seat 32, which run perpendicular to the light-receiving seat rails 34–35 described earlier. A guide stepper motor 58 is coupled to the light-receiving seat by a drive belt 60. The drive belt 60 may consist of a sawtooth-type engagement for use in engaging cogs on a step motor pulley wheel 62 at one end of the rails. A second wheel 64 maintains the tension of the drive belt at the opposite end of the rails. The light-receiving guide is coupled to the two opposing rails and rigidly connected to the drive belt by conventional connection guides 66 for incrementally moving between the two wheels.

Figure 8:
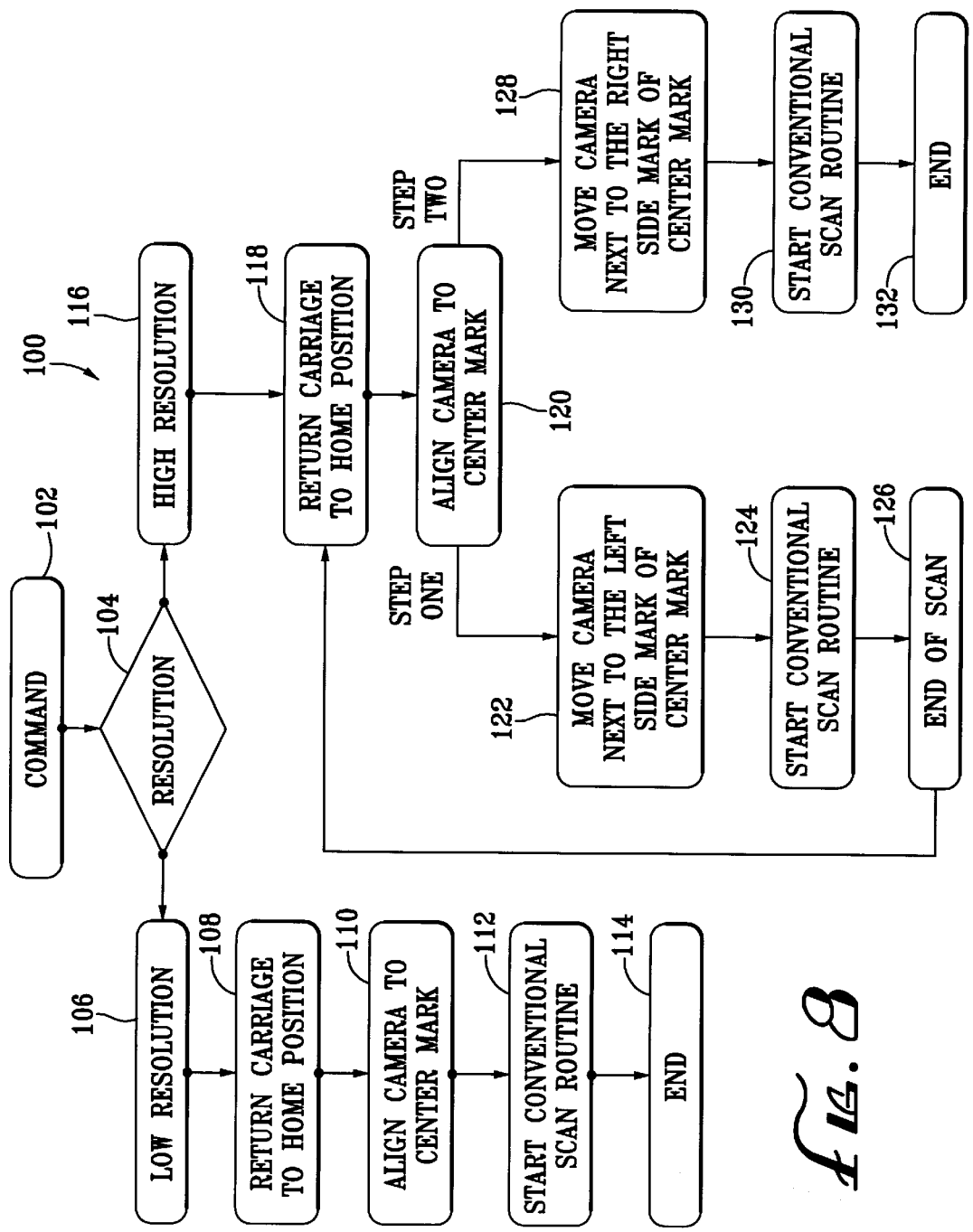
FIG. 8 is a flow chart showing process steps for a computer software routine to control operation of the scanner of the present invention.

With reference to FIGS. 2 and 3, the light-receiving guide 58 can be moved to either side of the light-receiving device by activation of the drive motor to move the light-receiving incrementally from side to side. A conventional central processing unit (CPU) (not shown) connected within the scanner controls the movement of the light-receiving device and guide. An example of a set of CPU implemented processing steps for this control is illustrated in FIG. 8. In the preferred embodiment, the lens may be adjusted between a wide angle of view and a narrow angle of view to adjust the CCD field of view between respective full and half views of the object to be scanned. The movement of the lens with respect to the CCD may be accomplished by any conventional means as used in other optical systems, such as photography and the like. The scanner CPU includes a software program which provides the means for the CCD and lens to be correspondingly adjusted in response to selection of a desired scanning mode.

Operation:

In a first scanning mode for low resolution full view (FIG. 5A), the scanner light-receiving guide 52 is positioned centrally along the side-to-side guide rails 54–55 in the conventional scanner CCD position, and the lens 48 is adjusted to focus the CCD upon the full 8-inch width range of the scanner's field of view. With respect to this positioning, the scanner operates in a conventional manner and the CCD is allowed to scan the object at the desired scan resolution that is conventionally available for that CCD. For a 4800-pixel CCD, low resolution is approximately 600 dots per inch (DPI).

Figure 5B:
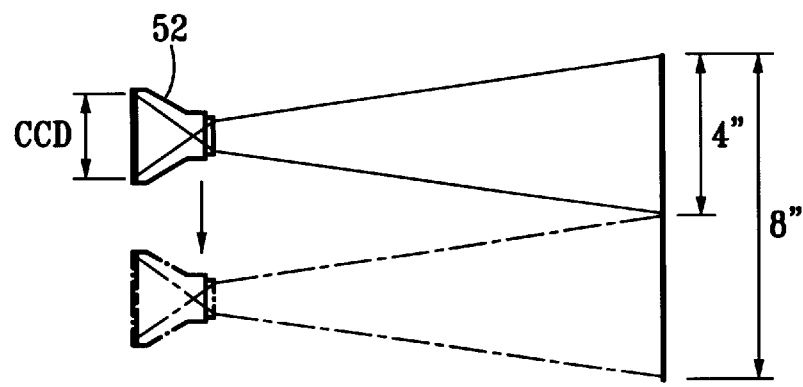
FIG. 5B is a diagrammatic view of a light receiving guide adjusted for scanning two columns along an image to be scanned.

In selecting a high resolution mode (FIG. 5B), the CPU will correspondingly adjust the CCD light-receiving guide 52 into a one-quarter position 70 along the length of the guide rails 54–55. The CCD 50 and lens 48 are then telescopically adjusted in a conventional manner such that the field range is narrowed by half. The scanner guide 52 then scans into memory a column of the object representing one-half of the total width of the scanned object. Upon completion of the first column, the receiving device returns to a start position and shifts the guide to a third-quarter position 72 about a second half of the object to be scanned. The light-receiving guide subsequently scans down the second column incorporating the data in the scanner memory, conventionally available software allows the two columns to then be stitched together, eliminating any overlap between the two scanned regions. The lens may also be fixed to permanently focus upon one-half the width of the object, thus fixing the scanner in a high resolution mode.

In an alternative embodiment, a marker (not shown) is provided at the outer edge of one of the ends of the scan region on the platen. The reference marker will provide a focusing point for the guide lens to shift and focus upon the proper position for scanning one-half of the object to be scanned. By providing a marker along the one end perimeter, the scanner may selectively scan down each column adjusting for the width of each without requiring any software "stitching" between the two ends.

Figure 5C:
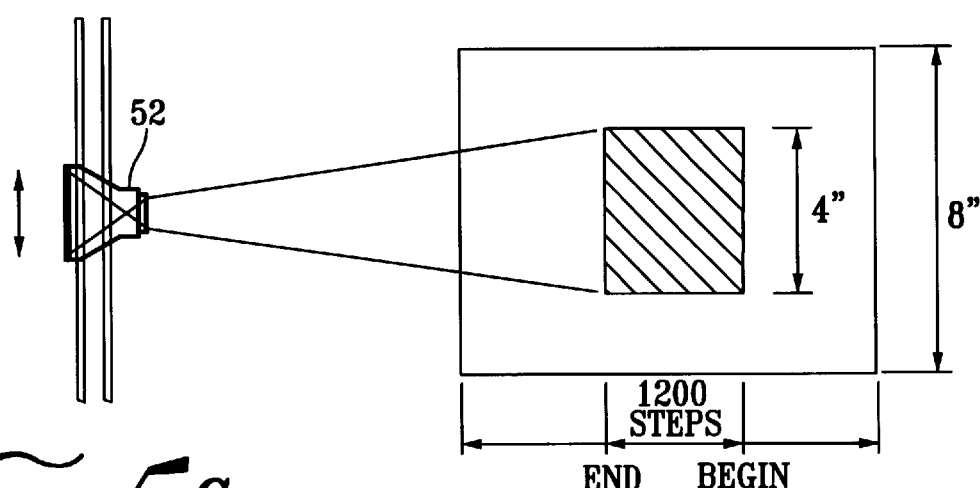
FIG. 5C is a diagrammatic view of the light-receiving device guide adapted for scanning an object of a small size.
Figure 6:
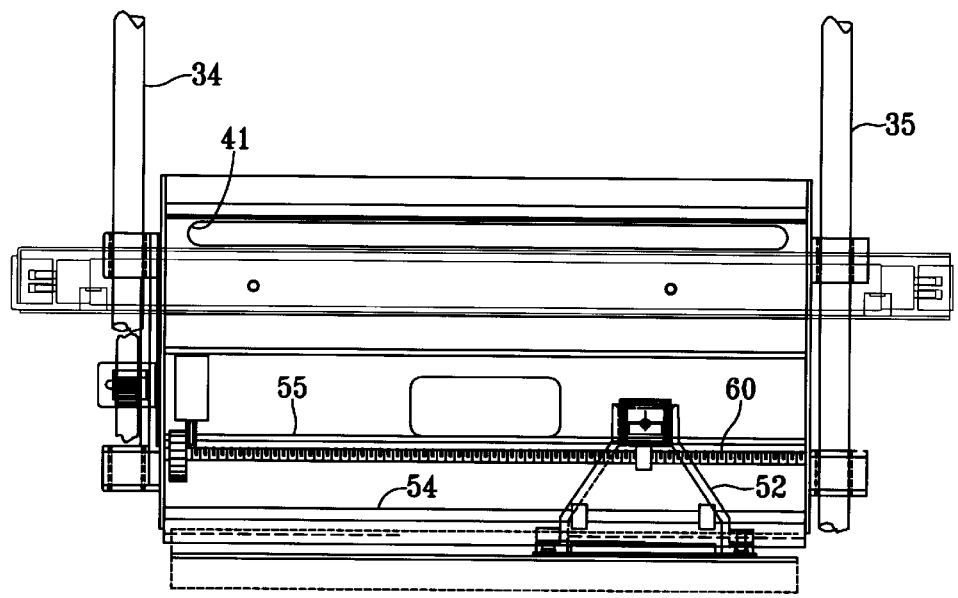
FIG. 6 is a cutaway top view of the light-receiving device of FIG. 2.

In a third alternative embodiment (FIG. 5C), the scanning CPU 68, may include software that determines the location of the outer perimeter of the object to be scanned. Once the perimeters have been found, the CPU 68 may adjust the scanner guide 52 in a proper side-to-side position for scanning down a column of the object and the resolution of the object may be determined by the size of the object and by its relative position with respect to the scanner.

In a fourth alternative embodiment (FIGS. 5D and 5E), the scanning guide 52 includes a high resolution adjustment for a plurality of columns and with respective focusing of the CCD and lens. In the high resolution adjustment (FIGS. 5D and 5E), the user determines the resolution to be used, and the camera selectively determines how many columns are necessary given the resolution of the CCD 50 and the width of the scanned object. The camera then selectively scans down each column and then combines the columns to obtain a higher resolution image. Those skilled in the art will appreciate that as the resolution is increased, the number of incremental steps, representing each line to be scanned, for the seat stepper motor 38 to incrementally move across a desired scan range may vary. In the seat stepper motor 38, a gear train (not shown) may be set up between the stepper motor 38 and the light-receiving device drive belt 40. The gear train may be used to incrementally shift the resolution of the stepper motor when shifting to higher resolutions, thereby allowing more lines per inch to be scanned.

Figure 7:
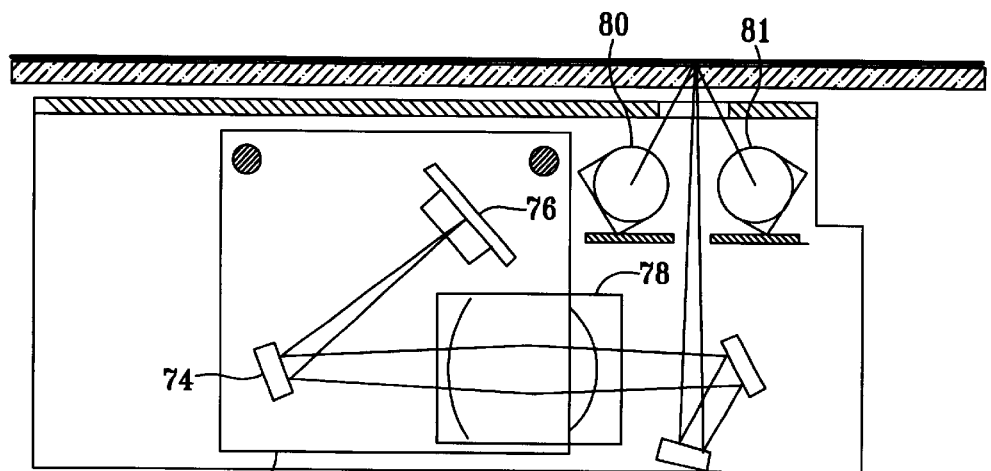
FIG. 7 is a cut-away side view of an alternate embodiment of the light-receiving device.

In yet a fifth embodiment (FIG. 7), the light-receiving guide may include a mirror 74 for reflecting light from the lens to a CCD 76 located above the lens 78. The inclusion of the mirror 74 within the light-receiving device guide permits the CCD and lens to be located in a more compact environment. By doing so, the amount of space taken up by the light-receiving guide is reduced. Also this alternative embodiment includes two light sources 80 and 81, that increase the amount of light reflected from the object to be scanned upon the light-receiving device optical receiver. These lights are designed to produce less heat than one high-watt bulb.

Referring to FIG. 8 a preferred set of CPU implemented processing steps for controlling operation of the preferred scanner of the present invention will be described. The routine 100 includes provision for energizing the device and placing it in a command mode 102, as is conventional. Next, at step 104, the resolution is selected. In the preferred embodiment, a low resolution selection 106, or high resolution 116 may be selected, each of which will be described in greater detail.

In the case of selection of low resolution 106, the next step includes a command 108 which returns the carriage to the home position. Next, in step 110, the camera is aligned to the center mark. Next, at step 112, the conventional scan routine is performed, and at the completion of the scan routine low resolution scanning is ended at step 114.

In the case of selecting the high resolution command 116, the next step, 118, returns the carriage to the home position. Next, at step 120, the camera is aligned to the center mark, from which each of an additional two-step process is begun. First, step 1 of the high resolution scanning, illustrated as step 122 in FIG. 8, moves the camera next to the left side mark of the center mark. Next, the conventional scanning routine is performed at step 124. Finally, at the end of the scan, step 126, the carriage is returned to its home position at 118. Subsequently, the camera is aligned to the center mark at step 120, and then begins the second of the two-step high resolution scanning, at step 128, in which the camera is moved next to the right side mark of the center mark 128. Next, conventional scanning routine 130 is performed on the right side of the object to be scanned, and at the completion of the scan routine, high resolution scanning is complete at step 132.

While the present invention has been described in connection with what are presently considered to be the most practical and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. A high resolution scanner assembly for use in a scanner housing having a pair of rails longitudinally mounted along opposite sides of the housing and a seat stepper motor and drive belt assembly mounted proximate to one of the rails, said scanner assembly comprising:

a light-receiving device including a light receiving seat movably connected to said rails and rigidly connected to said drive belt assembly for moving along said rails in response to said drive motor actuating said drive belt assembly;

said light-receiving device includes a pair of guide rails mounted transverse to said scanner rails, a guide driver located along said guide rails, a light receiving guide movably mounted on said guides rails and connected to said guide driver for movably positioning said guide along said guide seat and a plurality of mirrors for directing an illuminance of an object upon said light receiving guide;

said light-receiving guide includes an electro-optic transducer having a field of view for transmitting an electrical signal representative of the illuminance from an object in the field of view and a zoom lens for adjusting the width of the field of view of said transducer housed in an enclosed housing within said guide for receiving the illuminance of an object from said mirrors through said lens onto said transducer;

a CPU mounted within said housing and electrically connect to said transducer, said lens, said device driver and said guide driver;

a control program executed by said CPU for sequentially scanning at least a first select portion of said object and at least a second portion of said object, whereby said scanner assembly is operated by said control program to scans select portions of said object which when combined by said CPU provide a high resolution image of said object to be scanned.

* * * * *